US012067361B2

(12) United States Patent
Puri

(10) Patent No.: US 12,067,361 B2
(45) Date of Patent: Aug. 20, 2024

(54) SYSTEM AND METHOD FOR INFUSING KNOWLEDGE GRAPHS AND LANGUAGE MODELS FOR NATURAL LANGUAGE SENTENCE PAIR APPLICATIONS

(71) Applicant: Gnani Innovations Private Limited, Bengaluru (IN)

(72) Inventor: Armaan Puri, Bengaluru (IN)

(73) Assignee: Gnani Innovations Private Limited, Bengaluru (IN)

( * ) Notice: Subject to any disclaimer, the term of this patent is extended or adjusted under 35 U.S.C. 154(b) by 352 days.

(21) Appl. No.: 17/685,521

(22) Filed: Mar. 3, 2022

(65) Prior Publication Data
US 2023/0153527 A1    May 18, 2023

(30) Foreign Application Priority Data
Nov. 16, 2021   (IN) .............................. 202141052560

(51) Int. Cl.
*G06F 40/30* (2020.01)
*G06F 40/279* (2020.01)
*G06F 40/40* (2020.01)

(52) U.S. Cl.
CPC ............ *G06F 40/279* (2020.01); *G06F 40/40* (2020.01)

(58) Field of Classification Search
CPC ..... G10L 15/22; G10L 15/1815; G10L 20/15; G06N 3/044; G06N 3/045; G06N 5/04; G06N 3/042; G06N 3/08; G06N 20/00; G06N 5/025; G06N 5/022; G06F 3/167; G06F 40/30; G06F 16/3329; G06F 16/906; G06F 16/35; G06F 40/40; G06F 16/9024; G06F 16/25422; G06F 40/20
See application file for complete search history.

(56) References Cited

U.S. PATENT DOCUMENTS

| | | | |
|---|---|---|---|
| 9,846,692 B2 * | 12/2017 | Starostin | G06F 16/367 |
| 9,966,065 B2 * | 5/2018 | Gruber | G10L 15/28 |
| 10,437,833 B1 * | 10/2019 | Nguyen | G06N 5/046 |
| 10,699,196 B2 * | 6/2020 | Lindsley | G06N 5/043 |
| 10,755,177 B1 * | 8/2020 | Dabney | G06N 5/02 |
| 10,839,154 B2 * | 11/2020 | Galitsky | G06F 40/216 |
| 11,442,992 B1 * | 9/2022 | Moon | G06N 20/00 |
| 11,586,827 B2 * | 2/2023 | Galitsky | G06F 16/953 |
| 11,599,725 B2 * | 3/2023 | Galitsky | G06F 40/205 |

(Continued)

*Primary Examiner* — Jakieda R Jackson
(74) *Attorney, Agent, or Firm* — Holzer Patel Drennan

(57) ABSTRACT

The present disclosure relates to a system for infusing knowledge graphs and language models (LM) for natural language sentence pair tasks, the system include a processor operatively coupled to an inference engine, the inference engine configured to receive a sentence indicative of a premise and a sentence indicative of a hypothesis, extract LM embeddings for the corresponding sentence, generate a common-sense knowledge graph for corresponding sentence and nodes are derived from the common-sense knowledge graph, assign node importance scores for each of the derived nodes, compute node parameters for the derived nodes, apply an aggregation function to generate pooled values, concatenate the LM embeddings, graph embeddings and pooled values to generate concatenated data and classify the concatenation data to indicate a relationship between the natural language inference pair.

9 Claims, 4 Drawing Sheets

(56) References Cited

U.S. PATENT DOCUMENTS

| | | | | |
|---|---|---|---|---|
| 11,645,459 | B2* | 5/2023 | Galitsky | G06F 40/211 |
| | | | | 704/9 |
| 11,886,821 | B2* | 1/2024 | Sengupta | G06N 3/0442 |
| 2016/0306791 | A1* | 10/2016 | Allen | G06F 16/3329 |
| 2018/0336183 | A1* | 11/2018 | Lee | G06N 5/022 |
| 2019/0073420 | A1* | 3/2019 | Agapiev | G06N 3/08 |
| 2019/0197431 | A1* | 6/2019 | Gopalakrishnan | G06N 20/00 |
| 2019/0212879 | A1* | 7/2019 | Anand | G06Q 50/10 |
| 2020/0133952 | A1* | 4/2020 | Sheinin | G06N 3/045 |
| 2020/0286463 | A1* | 9/2020 | Galitsky | G06F 16/35 |
| 2020/0293874 | A1* | 9/2020 | Ji | G06N 3/08 |
| 2020/0320387 | A1* | 10/2020 | Ghaeini | G06F 40/20 |
| 2021/0272040 | A1* | 9/2021 | Johnson | G06N 5/022 |
| 2021/0287102 | A1* | 9/2021 | Fadnis | G06N 5/02 |
| 2021/0357595 | A1* | 11/2021 | Perez | G09B 7/02 |
| 2022/0058193 | A1* | 2/2022 | Smith | G06F 16/2465 |
| 2022/0138185 | A1* | 5/2022 | Tran | G06F 40/56 |
| | | | | 706/18 |
| 2022/0147861 | A1* | 5/2022 | Oltramari | G06N 3/088 |
| 2022/0199079 | A1* | 6/2022 | Hanson | H04L 51/02 |
| 2022/0335219 | A1* | 10/2022 | Sengupta | G06N 3/042 |
| 2023/0134798 | A1* | 5/2023 | Hoang | G06F 40/279 |
| | | | | 704/9 |
| 2023/0153534 | A1* | 5/2023 | Bansal | G06F 40/295 |
| | | | | 704/9 |

* cited by examiner

SYSTEM AND METHOD FOR INFUSING KNOWLEDGE GRAPHS AND LANGUAGE MODELS FOR NATURAL LANGUAGE SENTENCE PAIR APPLICATIONS

CROSS-REFERENCE TO RELATED APPLICATIONS

This application claims priority to Indian Application No. 202141052560, titled "SYSTEM AND METHOD FOR INFUSING KNOWLEDGE GRAPHS AND LANGUAGE MODELS FOR NATURAL LANGUAGE SENTENCE PAIR APPLICATIONS", filed on Nov. 16, 2021, which is hereby incorporated by reference for all that it discloses or teaches.

TECHNICAL FIELD

The present disclosure relates, in general, to natural language processing, and more specifically, relates to a system and method for infusing knowledge graphs and language models to create a framework in Siamese architecture.

BACKGROUND

Natural Language Inference (NLI) is an important classification task in natural language processing (NLP). A system can be given a pair of sentences and the system classifies the pair of sentences with respect to three different classes: entailment, neutral, and contradiction. The classification of the pair of sentences conveys whether the hypothesis is entailed by the given premise, whether it is a contradiction, or whether it is otherwise neutral. Recognizing textual entailment can be an important step in many NLP applications including automatic text summarizers, document simplifiers, as well as many other NLP applications.

Current art on sentence pair tasks such as natural language inference, semantic textual similarity and the likes rely primarily on language models and their ability to derive probabilistic patterns over text data. Such models do not understand complex reasoning or decipher facts from context. This lack of commonsense understanding led to the integration of knowledge graphs with language models. The current methods combine knowledge graph (KG) extracted features with language model (LM) features much later in the process and much of training and inference is independent.

Newer benchmarks such as adversarialNLI and breakingNLI show that language models do not truly understand the context around entities like a human would and most often fail because of a lack of reasoning ability. This understanding can be linked directly to commonsense understanding in humans. To incorporate commonsense, researchers have looked to combine language models and knowledge graphs by separately passing the input sequences to both sets of feature extractors.

Few existing research also realized that current (static) benchmarks for language tasks such as Stanford natural language inference (SNLI) are not ideal estimators of model performance due to early saturation, which leads to the creation of brittle models with overestimated NLU as showcased by recent benchmarks like breakingNLI and adversarialNLI.

Few existing methods rely on text data to implicitly teach language models to reason and understand facts. However, these existing methods suffer from limitations because certain "obvious" facts may not be captured in the dataset to avoid redundancy. To counter this, researchers turned to knowledge graphs that capture knowledge to be used alongside language models. However, current methods create a disjointed learning system and important context is often missed out or misinterpreted when querying knowledge graphs without the necessary context information. To provide this missing context, the existing methods suggests adding a human in the loop as done in Human-And-Model-in-the-Loop Enabled Training [HAMLET].

Although multiple mechanisms and frameworks exist today, these mechanisms and frameworks suffer from significant drawbacks. Hence, there is, therefore, a need in the art to overcome the aforementioned problems by capturing world knowledge and understanding the context around such knowledge without a human in the loop. The proposed solution is also versatile; any sentence pair task can be modelled in the proposed paradigm, creating a generalizable solution capable of understanding and using commonsense.

Objects of the Present Disclosure

An object of the present disclosure relates, in general, to natural language processing, and more specifically, relates to a system and method for infusing knowledge graphs and language models to create a framework in Siamese architecture.

Another objective of the present disclosure is to provide a system that creates a mutually informed learning paradigm, enabling LMs and KGs to take advantage of each other's strengths and mitigate weaknesses during learning and inference.

Another objective of the present disclosure is to provide a system that is better suited to handle dynamic benchmarks such as adversarialNLI and breakingNLI.

Another objective of the present disclosure is to provide a system that provides basic common-sense information to machines like humans which can further be utilized by the machine to solve real-world tasks.

Another objective of the present disclosure is to provide a system that avoids the need for humongous amounts of data. The system can examine different sentence features, and more explainable than traditional LMs.

Yet another objective of the present disclosure provides a system that provides common-sense usage in textual understanding without a human in the loop

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

SUMMARY

Figure 1A:
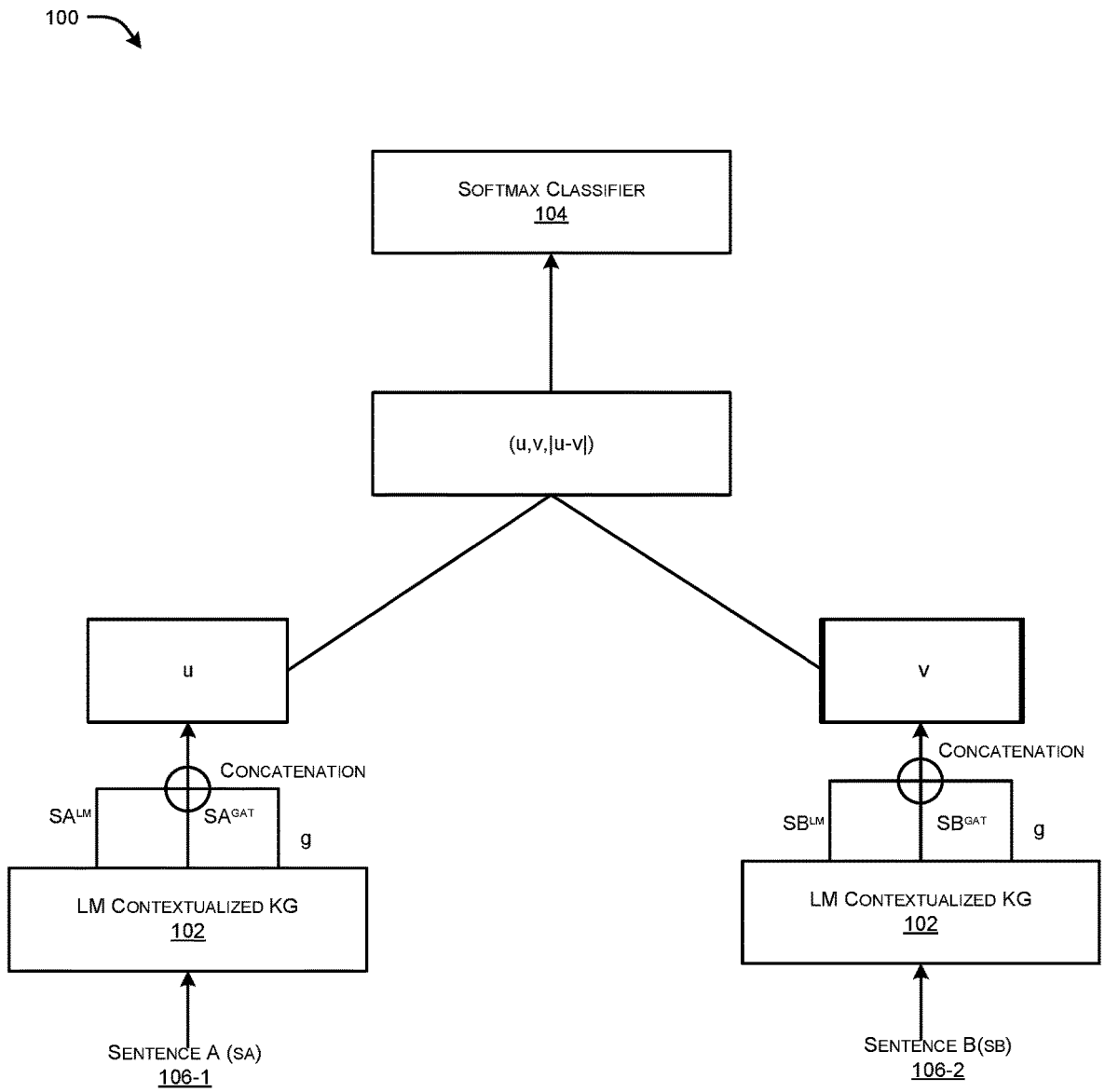
FIG. 1A illustrates siamese architecture for language model with knowledge graph informed inference, in accordance with an embodiment of the present disclosure.

The present disclosure relates, in general, to natural language processing, and more specifically, relates to a system and method for infusing knowledge graphs and language models to create a framework in Siamese architecture.

The existing benchmarks such as adversarialNLI and breakingNLI show that language models do not truly understand the context around entities like a human would and most often fail because of a lack of reasoning ability. To overcome the above limitation, the present disclosure can infuse common-sense and traditional language models. The present disclosure aims to create a joint learning and inference paradigm combining commonsense knowledge graphs and language models for sentence pair tasks since there is important context present around entities, events and social interactions in a sentence that enables commonsense understanding showcased by humans. A pre-trained language model is used to filter context for the knowledge graph and assign node and relational importance based on context. This is especially useful to model relations, allot appropriate meaning to polysemous words and handle entity dependencies based on reasoning/knowledge. Once this lower-level commonsense understanding is captured, sentence comparison can be robustly attained, even on complex, dynamic benchmarks such as breakingNLI and adversarialNLI.

In an aspect, the present disclosure provides a system for infusing knowledge graphs and language models for natural language sentence pair tasks, the system includes a processor operatively coupled to an inference engine, the processor operatively coupled to a memory, the memory storing instructions executable by a processor to receive a sentence indicative of a premise and a sentence indicative of a hypothesis, wherein the sentence indicative of the premise and the sentence indicative of the hypothesis form a natural language inference classification pair, process the sentence indicative of the premise and the sentence indicative of the hypothesis to extract LM embeddings of the sentence indicative of the premise and the sentence indicative of the hypothesis, generate a common-sense knowledge graph for corresponding sentence and extract premise sub-graphs and hypothesis sub-graphs using the knowledge graph, wherein nodes are derived from the common-sense knowledge graph, assign node importance scores for each of the derived nodes using LM embeddings, compute, by a graph attention network (GAT), node parameters for each of the derived nodes, apply an aggregation function to generate pooled values, concatenate the LM embeddings, graph embeddings and pooled values of graph to generate concatenated data and classify the concatenation data, wherein the output of classifying the concatenation data indicates a relationship between the natural language inference pair.

According to an embodiment, the node importance scores can be computed using pre-trained language model taking the premise sub-graphs and hypothesis sub-graphs as two separate contexts while the nodes remain the same for both the subgraphs.

According to an embodiment, the node importance scores is assigned for each of the derived nodes, wherein the derived nodes comprise premise nodes, hypothesis nodes and common nodes.

According to an embodiment, the common nodes formed based on the relationship with the premise nodes and the hypothesis nodes.

According to an embodiment, the node parameters comprise node type, relation between nodes, and node importance scores.

According to an embodiment, the common-sense knowledge graph is employed for natural language processing (NLP) tasks comprising natural language inference (NLI) and semantic textual similarity (STS).

According to an embodiment, the system determines similarities and differences between the corresponding sentences for NLI requirements.

According to an embodiment, the system computes cosine similarity to calculate semantic similarity between the corresponding sentences satisfying STS requirements.

In an aspect, the present disclosure provides a system method for infusing knowledge graphs and language models for natural language sentence pair tasks, the method comprising receiving, at a computing device, an input sentence indicative of a premise and an input sentence indicative of a hypothesis, wherein the sentence indicative of the premise and the sentence indicative of the hypothesis form a natural language inference classification pair, extracting, at the computing device, LM embeddings of input sentence indicative of the premise and input sentence indicative of the hypothesis, generating, at the computing device, a common-sense knowledge graph to extract premise sub-graphs and hypothesis sub-graphs using the common-sense knowledge graph, wherein nodes are derived from the common-sense knowledge graph, assigning, at the computing device, node importance scores for each of the derived nodes using LM embeddings, computing, at the computing device, node parameters for each of the derived nodes and applying an aggregation function to generate pooled values, concatenating, at the computing device, the LM embeddings, graph embeddings and pooled values of graph to generate concatenated data and classifying, at the computing device, the concatenation data, wherein the output of classifying the concatenation data indicates a relationship between the natural language inference pair.

Various objects, features, aspects, and advantages of the inventive subject matter will become more apparent from the following detailed description of preferred embodiments, along with the accompanying drawing figures in which like numerals represent like components.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The present disclosure relates, in general, to natural language processing, and more specifically, relates to a system and method for infusing knowledge graphs and language models to create a framework in Siamese architecture. In an embodiment, the system and method of the present disclosure enable to overcome the limitations of the prior art by creating a joint learning and inference paradigm combining commonsense knowledge graphs and language models for sentence pair tasks since there is important context present around entities, events and social interactions in a sentence that enables commonsense understanding showcased by humans. A pre-trained language model is used to filter context for the knowledge graph and assign node and relational importance based on context. This is especially useful to model relations, allot appropriate meaning to polysemous words and handle entity dependencies based on reasoning/knowledge.

In an embodiment, after capturing the lower-level commonsense understanding, sentence comparison can be robustly attained, even on complex, dynamic benchmarks such as breakingNLI and adversarialNLI. The present disclosure can be described in enabling detail in the following examples, which may represent more than one embodiment of the present disclosure.

On specific NLP tasks such as NLI/STS, the existing art does not truly combine LM and KG features but merges them at the end, before the final prediction. In an embodiment, the system and method of the present disclosure enable to overcome the limitations of the prior art by creating a mutually informed learning paradigm, enabling LMs and KGs to take advantage of each other's strengths and mitigate weaknesses during learning and inference. Due to the framework design and components, the proposed system is better suited to handle dynamic benchmarks such as adversarialNLI and breakingNLI.

In an embodiment, the system and method of the present disclosure can inductively understand entities from large commonsense KGs and contextually combine them with LMs to create a feature space better suited for comparison. The description of terms and features related to the present disclosure shall be clear from the embodiments that are illustrated and described; however, the invention is not limited to these embodiments only. Numerous modifications, changes, variations, substitutions, and equivalents of the embodiments are possible within the scope of the present disclosure. Additionally, the invention can include other embodiments that are within the scope of the claims but are not described in detail with respect to the following description.

FIG. 1A illustrates Siamese architecture for language model with knowledge graph informed inference, in accordance with an embodiment of the present disclosure.

Referring to FIG. 1A, system 100 may be implemented by way of a single device or a combination of multiple devices that are operatively connected or networked together. The system 100 may be implemented in hardware or a suitable combination of hardware and software. The system 100 can be given a pair of sentences e.g., premise and hypothesis, and the system classifies the pair of sentences with respect to three different classes: entailment, neutral, and contradiction. The present disclosure can enable sentence pair natural language inference (NLI), semantic textual similarity (STS) task learning and inference by augmenting language models (LM) with common sense knowledge extracted from knowledge graphs (KG) in a co-dependent setup instead of independent components.

As illustrated, the system 100 may be a computing device including a processor operatively coupled to a memory executing machine readable program instructions. The computing device may include laptop computer, a desktop computer, a notebook, a workstation and the likes. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor may include, for example, microprocessors, microcomputers, microcontrollers, digital signal processors, central processing units, state machines, logic circuits, and/or any devices that manipulate data or signals based on operational instructions. Among other capabilities, processor may fetch and execute computer-readable instructions in a memory operationally coupled with system 100 for performing tasks such as data receiving, data processing input/output processing, attribute extraction, and/or any other functions. Any reference to a task in the present disclosure may refer to an operation being or that may be performed on data.

Figure 2:
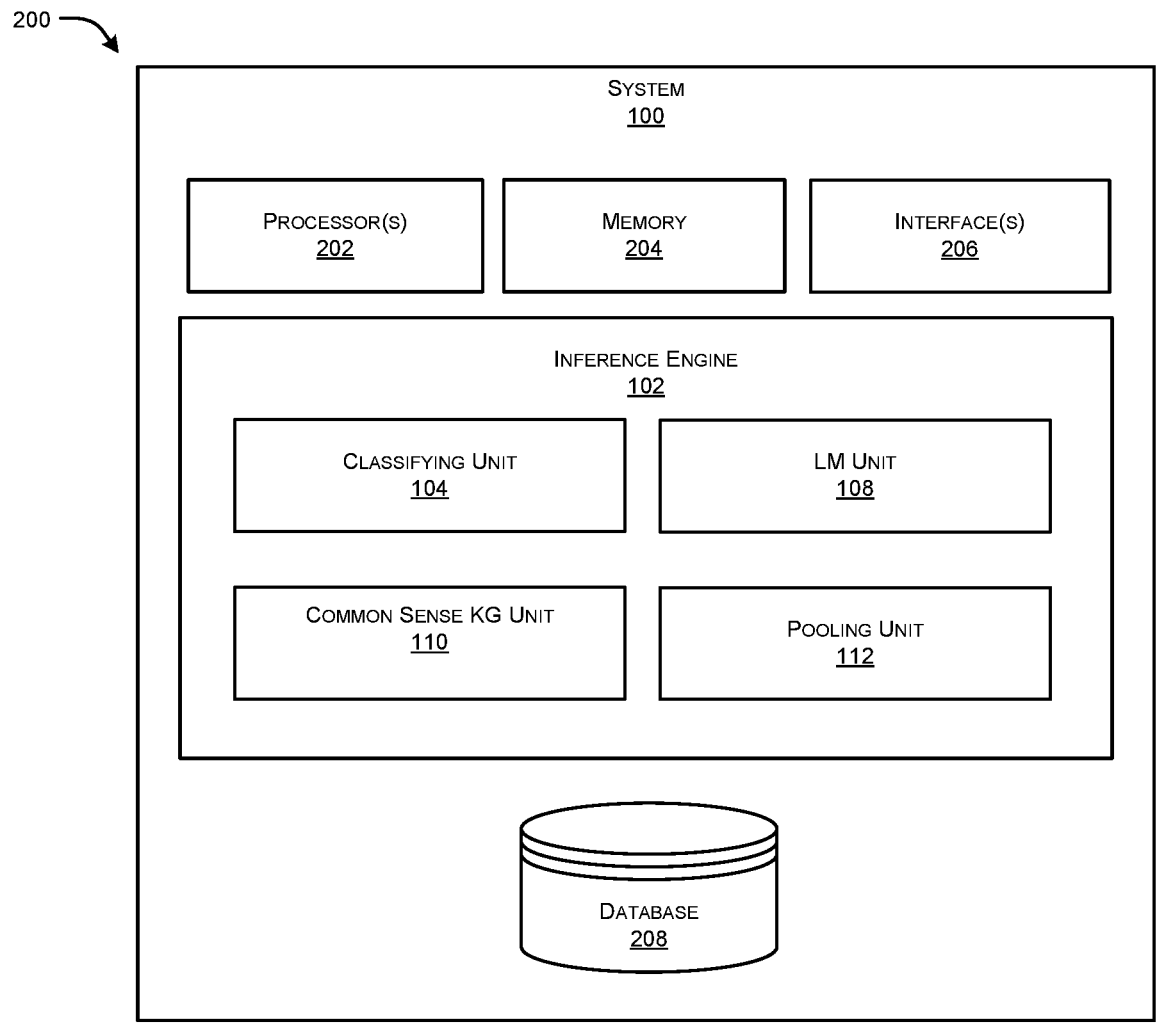
FIG. 2 illustrates exemplary functional components of the proposed system in accordance with an embodiment of the present disclosure.

The processor 202 (as illustrated in FIG. 2) operatively coupled to an inference engine 102 to receive a sentence indicative of a premise 106-1 and a sentence indicative of hypothesis 106-2, where the sentence indicative of the premise 106-1 and the sentence indicative of the hypothesis 106-2 form a natural language inference classification pair. In an exemplary embodiment, the inference engine 102 can be a language model (LM) contextualised knowledge graph (KG). In an exemplary embodiment, NLI with a classification unit 104 is depicted in FIG. 1A determines similarities and differences between the sentences for NLI requirements. Similarly, cosine similarity can be computed to calculate semantic similarity between the sentences, satisfying STS requirements.

The pair of NLI sentences generally can have three relationship classifications: entailment, contradiction, and neutral. An entailment classification can indicate the hypothesis sentence is related to the premise sentence. A contradiction classification can indicate the hypothesis sentence is not related to the premise sentence. Alternatively, a neutral classification can indicate hypothesis sentence has neither an entailment classification nor a contradiction classification.

For example, the premise sentence "A junior is waiting at the window of a restaurant that serves food." can be linked with various hypothesis sentences. The hypothesis sentence "A person waits to be served his food." can indicate an entailment classification (i.e., the hypothesis sentence has a relationship with the premise sentence). The hypothesis sentence "A man is looking to order a grilled cheese sandwich." can indicate a neutral classification (i.e., the hypothesis sentence has neither entailment nor contradiction with the premise sentence). Additionally, the hypothesis sentence "A man is waiting in line for the vehicle." can indicate a contradiction classification (i.e., the hypothesis sentence has no relationship with the premise sentence).

Figure 1B:
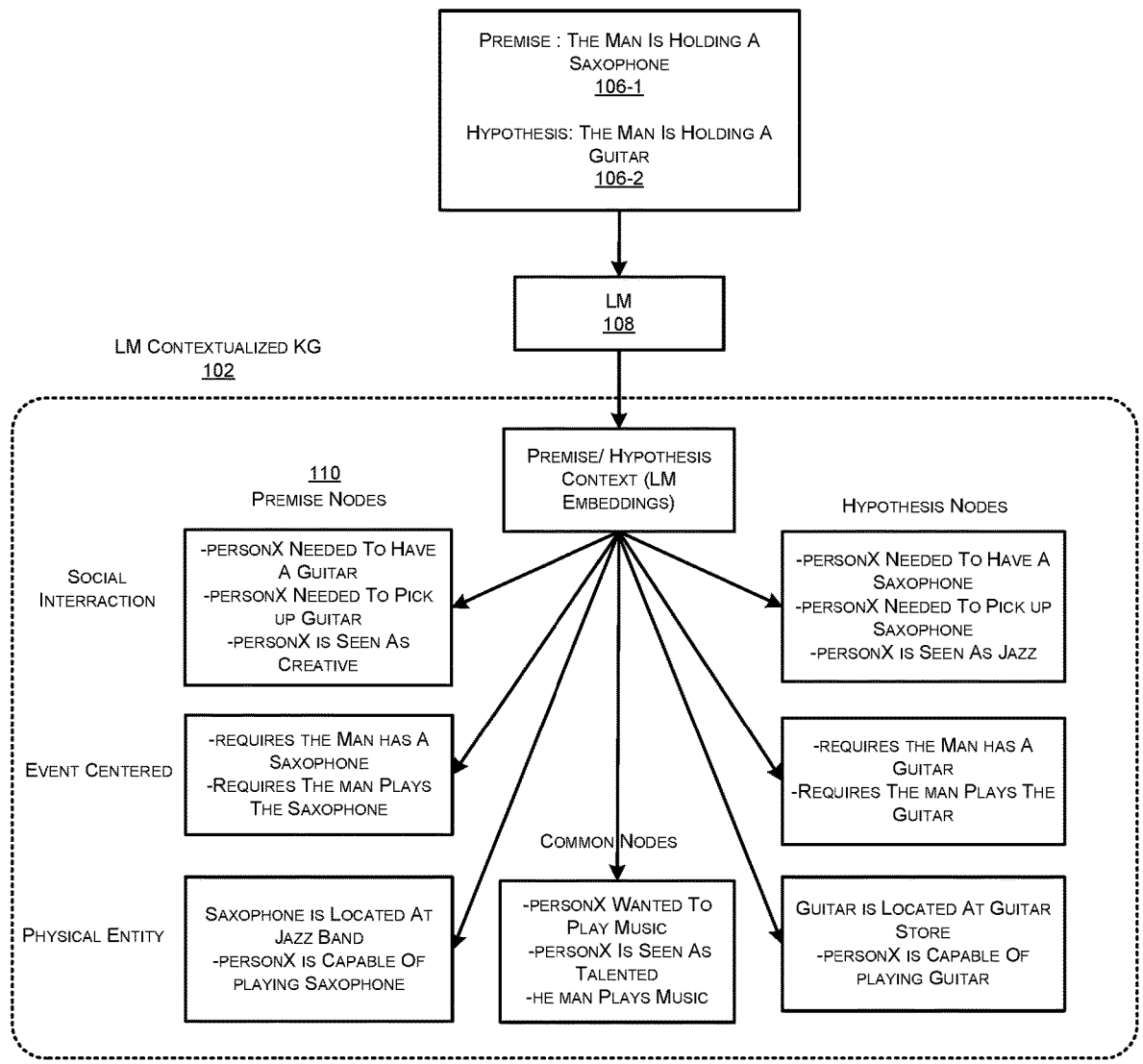
FIG. 1B is a high-level diagram illustrating the extraction of subgraph and assigning node importance, in accordance with an embodiment of the present disclosure.

FIG. 1B is a high-level diagram illustrating the extraction of subgraph and assigning node importance, in accordance with an embodiment of the present disclosure. The inference engine 102 may include LM unit 108 and knowledge graph (KG) unit 110. The term "LMs" as used herein are trained on large amounts of unstructured data providing them with the ability to understand linguistic features but not necessarily to reason. The term "KGs" used herein, however, are built to enable structured reasoning. More specifically, common-sense KGs such as ConceptNet and ATOMIC capture day to day entities and events; holding information in the form of text about different aspects of the entities. The system known in the art relies either purely on LMs to learn to solve sentence pair tasks or combines LMs and KGs to solve tasks such as NLI and STS. The latter is similar to the proposed approach, however, the method of combination in the proposed algorithm is novel for sentence pair applications.

Siamese networks have shown impressive results in comparative tasks in deep learning applications and specifically in NLP tasks such as NLI and STS. However, only LM based Siamese networks have been explored till now. The present disclosure combines LM and KGs in Siamese architecture for proper feature extraction and differentiation between sentence pairs. Besides that, few methods known in the art provides NLI that combines LMs and KGs that tries to filter non-relevant nodes separately, without grasping linguistic context (personalized page rank or customer algorithms used) from the LM. To overcome this limitation, the present disclosure is capable of using LM embeddings for node importance scoring in a generalizable framework. Few methods known in the art use Graph Convolutional Networks (GCNs) which are sub-optimal for high degree multi-relational graphs such as commonsense knowledge graphs. To overcome this limitation, the present disclosure may use graph attention networks (GATs) that are better suited due to their ability to assign node importance. Further, the inherent capabilities of GATs can be enhanced by tying the GAT attention framework to the LM context embeddings.

In an embodiment, the sentence indicative of premise 106-1 can be passed to the LM unit 108 to extract embeddings of the sentence indicative of premise 106-1, which can transform words in premise sentence into a word representation. Similarly, the sentence indicative of hypothesis 106-2 can be passed to the LM unit 108 to transform words in the hypothesis sentence into a word representation.

The knowledge graph unit 110 can generate a knowledge graph (also referred to as common-sense knowledge graph) comprising nodes and edges and extract premise sub-graphs and hypothesis sub-graphs using the knowledge graph. Nodes are derived from the common-sense knowledge graph. The node importance scores can be assigned for each of the derived nodes using LM embeddings. The derived nodes (also interchangeably referred to as common sense graph nodes,) can include premise nodes, hypothesis nodes and common nodes. The common nodes are formed based on the relationship with the premise nodes and the hypothesis nodes.

The LM contextualized graph assigns node importance scores to each of the common-sense graph nodes. In an exemplary embodiment, nodes are derived from the common-sense KG such as CoMET. As shown in FIG. 1B left lines indicates node importance for premise nodes, right lines for hypothesis nodes and middle lines for common nodes based on their relationship with the premise/hypothesis. The score is computed using via a conventional pre-training method considering the premise sub-graphs and hypothesis sub-graphs as contexts separately with nodes being the same for both subgraphs. In an exemplary embodiment, the pre-training method can be a next sentence prediction (NSP).

The GAT captures the dependence of graphs through message passing between the nodes of the graphs. While computing the internal message passing in the GAT, node parameters such as the node type, relation between nodes and the node importance score are taken into account. The node parameters for each of the derived nodes can be computed using GAT and passed to the pooling process. The pooling unit 112 can apply an aggregation function to generate pooled values.

The LM embeddings, graph embeddings and pooled values of the graph can be concatenated to generate concatenated data. For example, consider "sentence a" as (SA) 106-1 and "sentence b" as (SB) 106-2, concatenating the context LM embeddings (premise/hypothesis) [$SA^{LM}/SB^{LM}$], context graph embeddings [$SA^{GAT}/SB^{GAT}$], and pooled hidden layers of contextualized KG [g] the final embeddings are computed. The concatenation data is classified using the classifying unit 104. In an exemplary embodiment, the classifying unit 104 can be a softmax classifier. The output of classifying the concatenation data indicates a relationship between the natural language inference pair.

The concatenated premise sentence can be represented by u. Similarly, concatenated hypothesis sentence can be represented by v. In another embodiments, classification input can be fed into the softmax classifier. The softmax classifier can generate a classification label for the given premise and hypothesis NLI sentence pair. The concatenation of u and v, for example, (u,v, |u, v|) can be fed into softmax classifier 104 that can include generate a classification label for the given premise and hypothesis NLI sentence pair. In a variety of embodiments, the model can be trained in an end-to end-manner. These embeddings can be compared in any sentence comparison framework with an appropriate head appended at the end.

For example, by comparing two sentences where "sentence a" is the premise/context and "sentence b" is the hypothesis based on that context. The natural language inference is the task of determining whether a hypothesis is true, false, or undetermined given a premise.

Sentence a: A melee weapon is any weapon used in direct hand-to-hand combat; by contrast with ranged weapons which act at a distance.

Sentence b: Melee weapons are good for ranged and hand-to-hand combat.

Using one of the known art language models (LM), the natural language inference (NLI) prediction is that the two sentences mean the same thing (sentence b is an entailment of sentence a), as shown in the adversarial NLI research. However, sentence b contradicts sentence a (i.e., melee weapons are not for ranged combat). This false prediction by the LM is primarily because LMs cannot understand the key difference of "range" in weapon systems, which may be common-sense for humans. The problem is further complicated by the need for an astronomical amount of data to provide LMs with common sense. Similar examples are presented in breakingNLI and adversarialNLI, stating that current sentence pair systems are brittle and not as intelligent as initially thought since they lack the ability to determine key differences caused by subtle linguistic features. To overcome the above limitations, the system 100 of the present disclosure can effectively determine key similarities and differences through the common-sense knowledge graph and provide those similarities/differences the appropriate importance while comparing two sentences through LM contextualized KG 102.

In an embodiment, the system and method of the present disclosure enable to overcome the limitations of the prior art by creating a joint learning and inference paradigm combining commonsense knowledge graphs and language models for sentence pair tasks since there is important context present around entities, events and social interactions in a sentence that enables commonsense understanding showcased by humans.

The advantages achieved by the system and method of the present disclosure can be clear from the embodiments provided herein. The system 100 can provide basic commonsense information to machines similar to humans which can further be utilized by the machine to solve real world tasks. The system 100 avoids the need for humongous amounts of data. The system 100 can examine different sentence features, the method is also more explainable than traditional LMs.

In an embodiment, the system and method of the present disclosure can create a mutually informed learning paradigm, enabling LMs and KGs to take advantage of each other's strengths and mitigate weaknesses during learning and inference. The system is better suited to handle dynamic benchmarks such as adversarialNLI and breakingNLI. The system provides common sense usage in textual understanding without a human in the loop FIG. 2 illustrates exemplary functional components 200 of the proposed system in accordance with an embodiment of the present disclosure.

In an aspect, the system 100 may comprise one or more processor(s) 202. The one or more processor(s) 202 may be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions stored in a memory 204 of the system 100. The memory 204 may store one or more computer-readable instructions or routines, which may be fetched and executed to create or share the data units over a network service. The memory 204 may comprise any non-transitory storage device including, for example, volatile memory such as RAM, or non-volatile memory such as EPROM, flash memory, and the like.

The system 100 may also comprise an interface(s) 206. The interface(s) 206 may comprise a variety of interfaces, for example, interfaces for data input and output devices, referred to as I/O devices, storage devices, and the like. The interface(s) 206 may facilitate communication of system 100. The interface(s) 206 may also provide a communication pathway for one or more components of the system 100.

The inference engine(s) 102 may be implemented as a combination of hardware and programming (for example, programmable instructions) to implement one or more functionalities of the inference engine(s) 102. In examples described herein, such combinations of hardware and programming may be implemented in several different ways.

The data 208 may comprise data that is either stored or generated as a result of functionalities implemented by any of the components of the inference engine 102 or the system 100. In an exemplary embodiment, the inference engine 102 may include LM unit 108, common-sense KG unit 110, classifying unit 104, pooling unit 112 and other engine(s).

In an embodiment, the sentence indicative of the premise/hypothesis can be passed to the LM unit 104 to extract LM embeddings. The common-sense knowledge graph (KG) unit 110 can generate common-sense KG for corresponding embedded sentences so as to extract premise sub-graphs and hypothesis sub-graphs using the common-sense knowledge graph. Nodes are derived from the common-sense knowledge graph. The node importance scores can be assigned for each of derived nodes using LM embeddings. While computing the internal message passing in the GAT, node parameters such as the node type, relation between nodes and the node importance score are taken into account. The node parameters for each of the derived nodes can be computed using GAT and passed to the pooling process. The pooling unit 112 can apply an aggregation function to generate pooled values. The context LM embeddings (premise/hypothesis) $[SA^{LM}/SB^{LM}]$, context graph embeddings $[SA^{GAT}/SB^{GAT}]$, and pooled hidden layers of contextualized KG [g] are concatenated and the final embeddings are computed. The classifying unit 104 can classify the concatenation data, where the output of classifying the concatenation data indicates a relationship between the natural language inference pair.

Figure 3:
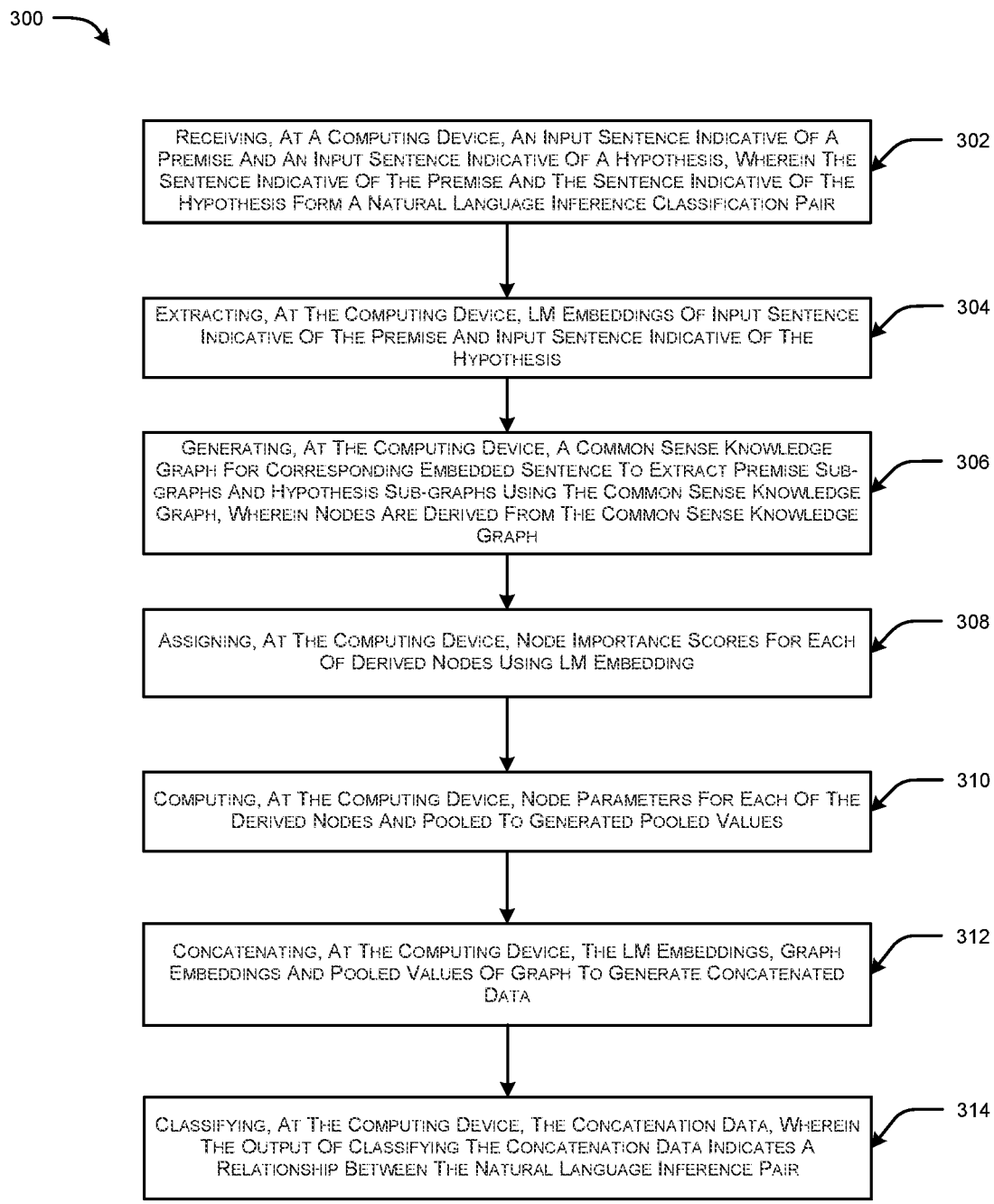
FIG. 3 illustrates exemplary flow chart of the method for infusing knowledge graphs and language models for natural language sentence pair applications, in accordance with an embodiment of the present disclosure.

FIG. 3 illustrates exemplary flow chart of the method for infusing knowledge graphs and language models for natural language sentence pair applications, in accordance with an embodiment of the present disclosure.

The method 300 may be described with respect to the system having one or more hardware that performs the method 300. The method 300 can be implemented using a computing device, which can include one or more processors. The method 300 includes, at step 302, the sentence indicative of the premise and the sentence indicative of hypothesis can be received at the computing device, where the sentence indicative of the premise and the sentence indicative of the hypothesis form the natural language inference classification pair.

At block 304, LM embeddings of sentence indicative of the premise and sentence indicative of the hypothesis is extracted. At block 306, a common-sense knowledge graph can be generated for corresponding embedded sentence and extract premise sub-graphs and hypothesis sub-graphs using the common sense knowledge graph, where nodes are derived from the common sense knowledge graph.

At block 308, the node importance scores can be assigned for each of derived nodes using LM embeddings. At block 310, the node parameters can be computed for each of the derived nodes and apply aggregation function to generated pooled values.

At block 312, the LM embeddings, graph embeddings and pooled values of the graph can be concatenated to generate concatenated data and at block 314, the concatenation data is classified by the classifying unit, where the output of classifying the concatenation data indicates a relationship between the natural language inference pair.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Present Disclosure

The present disclosure provides a system that creates a mutually informed learning paradigm, enabling LMs and KGs to take advantage of each other's strengths and mitigate weaknesses during learning and inference.

The present disclosure provides a system that is better suited to handle dynamic benchmarks such as adversarial-NLI and breakingNLI.

The present disclosure provides a system that provides basic common-sense information to machines like humans which can further be utilized by the machine to solve real-world tasks.

The present disclosure provides a system that avoids the need for humongous amounts of data. The system can examine different sentence features, the method is also more explainable than traditional LMs.

The present disclosure provides a system that provides common-sense usage in textual understanding without a human in the loop.

I claim:

1. A system for infusing knowledge graphs and trained language models (LM) for natural language sentence pair tasks, said system comprising:
    a processor operatively coupled to an inference engine, the processor operatively coupled to a memory, the memory storing instructions executable by the processor to:
        receive a sentence indicative of a premise and a sentence indicative of a hypothesis, wherein the sentence indicative of the premise and the sentence indicative of the hypothesis form a natural language inference classification pair;
        process the sentence indicative of the premise and the sentence indicative of the hypothesis to extract trained LM embeddings of the sentence indicative of the premise and the sentence indicative of the hypothesis;
        generate a common-sense knowledge graph for corresponding sentence to extract premise sub-graphs and hypothesis sub-graphs using the knowledge graph, wherein nodes are derived from the common-sense knowledge graph;
        assign node importance scores for each of the derived nodes using trained LM embeddings;
        compute, by a graph attention network (GAT), node parameters for each of the derived nodes, apply an aggregation function to generate pooled values;
        concatenate the trained LM embeddings, graph embeddings and pooled values of graph to generate concatenated data; and
        classify the concatenation data, wherein the output of classifying the concatenation data indicates a relationship between the natural language inference pair.

2. The system as claimed in claim 1, wherein the node importance scores are computed using pre-trained language model taking the premise sub-graphs and hypothesis sub-graphs as two separate contexts while the nodes remain the same for both the subgraphs.

3. The system as claimed in claim 1, wherein the node importance scores is assigned for each of the derived nodes, wherein the derived nodes comprise premise nodes, hypothesis nodes and common nodes.

4. The system as claimed in claim 3, wherein the common nodes formed based on the relationship with the premise nodes and the hypothesis nodes.

5. The system as claimed in claim 1, wherein the node parameters comprise node type, relation between nodes, and node importance scores.

6. The system as claimed in claim 1, wherein the common-sense knowledge graph is employed for natural language processing (NLP) tasks comprising natural language inference (NLI) and semantic textual similarity (STS).

7. The system as claimed in claim 1, wherein the system determines similarities and differences between the sentences for natural language inference (NLI) requirements.

8. The system as claimed in claim 1, wherein the system computes cosine similarity to calculate semantic similarity between the sentences satisfying semantic textual similarity (STS) requirements.

9. A method for infusing knowledge graphs and trained language models for natural language sentence pair tasks, the method comprising:
    receiving, at a computing device, a sentence indicative of a premise and a sentence indicative of a hypothesis, wherein the sentence indicative of the premise and the sentence indicative of the hypothesis form a natural language inference classification pair;
    extracting, at the computing device, trained LM embeddings of the sentence indicative of the premise and the sentence indicative of the hypothesis;
    generating, at the computing device, a common-sense knowledge graph to extract premise sub-graphs and hypothesis sub-graphs using the common-sense knowledge graph, wherein nodes are derived from the common-sense knowledge graph;
    assigning, at the computing device, node importance scores for each of the derived nodes using trained LM embeddings;
    computing, at the computing device, node parameters for each of the derived nodes and applying an aggregation function to generate pooled values;
    concatenating, at the computing device, the trained LM embeddings, graph embeddings and pooled values of graph to generate concatenated data; and
    classifying, at the computing device, the concatenation data, wherein the output of classifying the concatenation data indicates a relationship between the natural language inference pair.

* * * * *